June 10, 1952 W. S. MORTLEY 2,600,124

PIEZOELECTRIC CRYSTAL CIRCUIT ARRANGEMENT

Filed Nov. 12, 1947

INVENTOR.
WILFRID SINDEN MORTLEY
BY Harry Tunick

Patented June 10, 1952

2,600,124

UNITED STATES PATENT OFFICE 2,600,124

PIEZOELECTRIC CRYSTAL CIRCUIT ARRANGEMENT

Wilfrid Sinden Mortley, Great Baddow, Chelmsford, England, assignor to Radio Corporation of America, a corporation of Delaware Application November 12, 1947, Serial No. 785,344
In Great Britain November 21, 1946

6 Claims. (Cl. 250—36)

This invention relates to piezoelectric crystal circuit arrangements and has for its object to provide improved piezoelectrically controlled circuit arrangements in which the controlled frequency is modulated. More specifically the invention relates to crystal controlled frequency modulated oscillators.

The specification of U. S. Patent No. 2,551,809 describes an invention wherein a piezoelectric crystal, which is to be employed in conjunction with a variable susceptance for producing a modulated frequency, is associated with said variable susceptance through a quarter wave line or equivalent impedance inverting network or device.

The present invention (though not limited exclusively in its application thereto) is particularly applicable to arrangements in accordance with the invention described in the above mentioned copending application.

One of the difficulties encountered in practice with a frequency modulated oscillator in accordance with the invention contained in the aforesaid patent referred to, and in other cases in which a loss introducing network is associated with the crystal, is that the unavoidable loss in the quarter wave or other network tends to give rise to amplitude modulation, and also to a certain amount of frequency modulation distortion. Where large deviations of frequency are required, the amplitude modulation may easily become too great to be eliminated in subsequent limiting amplifiers, and the frequency modulation distortion may also become appreciable.

An object of the present invention is to avoid the above mentioned difficulties and defects.

According to this invention, a frequency modulated crystal oscillator of the kind wherein a loss introducing network is provided in association with the crystal, includes also means for generating so-called negative resistance (i. e., reaction) and applying said negative resistance to the loss introducing component or components in the network so as to substantially counterbalance said loss.

The negative resistance may be generated by an electron discharge tube circuit, and applied either in series or in parallel with the loss introducing circuit component or components.

The invention is illustrated in the accompanying drawing which diagrammatically shows two embodiments in accordance therewith.

Figure 1:
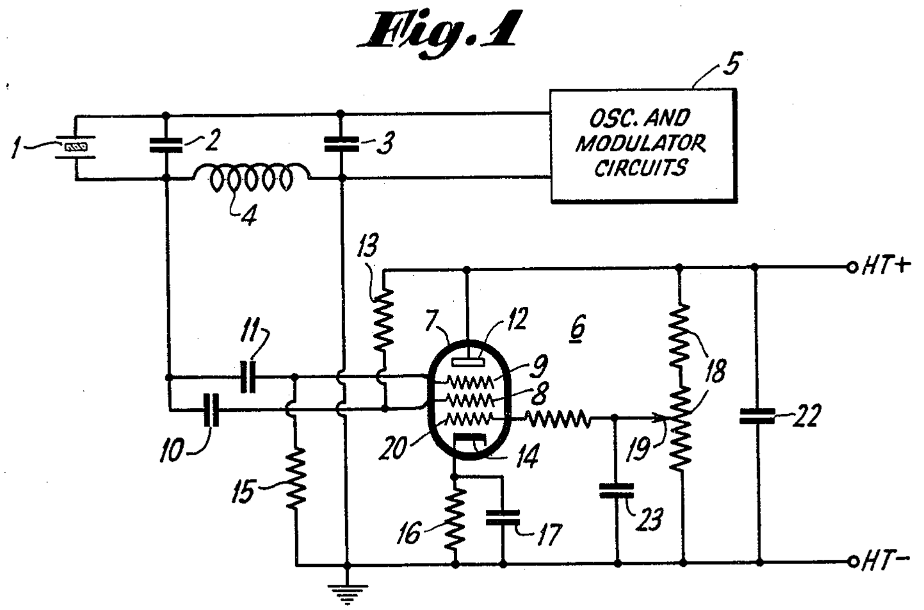
Fig. 1 is a preferred embodiment of the invention.

Referring to Fig. 1, which shows an embodiment of the invention which is in accordance with the invention contained in the U. S. Patent No. 2,551,809 referred to above, a frequency modulated crystal oscillator comprises a piezoelectric crystal 1 which is associated with oscillator and modulator circuits by means of a quarter wave network consisting of two shunt capacity branches 2, 3 and a series inductance branch 4. The oscillator and modulator circuits, which may be of any suitable form known per se, are represented merely by block 5. The inductance branch 4 is included in the lead between one side of the crystal and the "earthy" terminal of the oscillator and modulator arrangement, while the capacity branches 2, 3 are connected directly between the two leads from the crystal, one on one side of the inductance and the other on the other. In accordance with this invention an adjustable negative resistance network generally designated 6 is provided to apply negative resistance in parallel with the inductance 4. Neither terminal of the crystal is connected to ground. In Fig. 1 the negative resistance is provided by a so-called "transitron" valve circuit as known per se. This is shown as consisting of, for example, a pentode 7 having its screen and suppressor grids 8, 9 connected through separate condensers 10, 11 to the crystal side of the inductance 4, the anode 12 being connected to HT+ and, through a resistance 13, to the screen grid 8. The suppressor grid 9 and the cathode 14 are connected to earth through separate resistances 15, 16, the resistance 16 in the cathode leg connection being shunted by a by-pass condenser 17. The earth point is also connected to the oscillator circuit side of the inductance 4. The HT— terminal is earthed and a potentiometer resistance 18 is connected across the HT source, a variable tap 19 on this resistance being connected to the control grid 20 through a further resistance. The potentiometer resistance 18 is shunted by a bypass condenser 22, and a further bypass condenser 23 is provided between the variable tap 19 and earth. This pentode circuit, which is known per se, produces a negative resistance effect across the inductance 4, the amount of negative resistance being adjustable by adjusting the operating potential on the potentiometer—in the circuit specifically shown in Fig. 1 by adjusting the potentiometer tap 19.

In practice the amount of negative resistance is adjusted until amplitude modulation of twice the modulation frequency is reduced substantially to zero, thus indicating that loss in the inductance 4 (the only appreciable loss introducing element in the quarter wave network) is balanced. The second harmonic rather than the fundamental frequency is taken as the criterion since many modulators are themselves liable to introduce fundamental amplitude modulation unless correctly adjusted, and accordingly the said second harmonic criterion is a more useful one to adopt.

Figure 2:
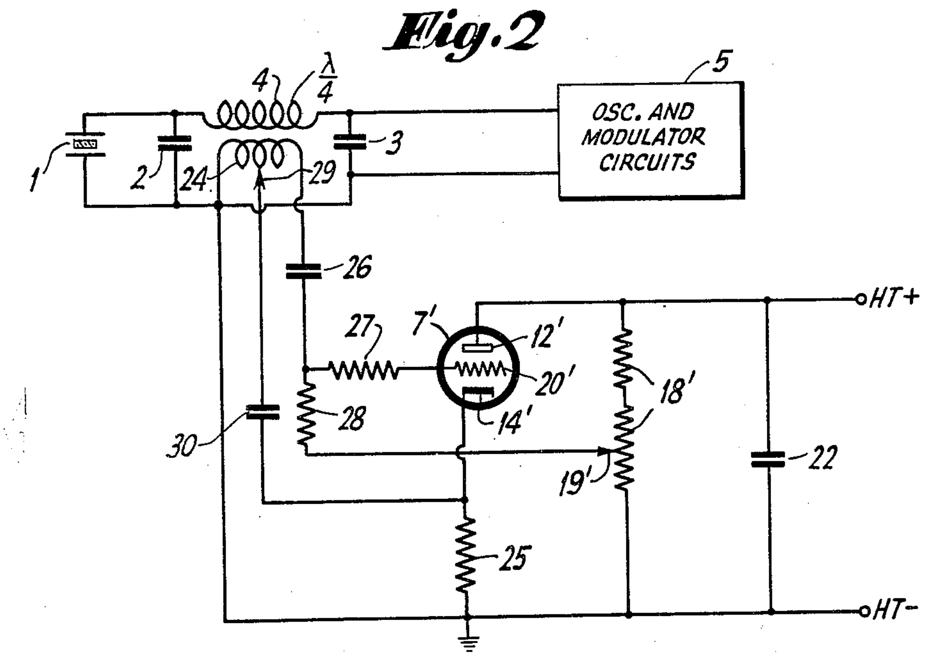
Fig. 2 is an embodiment of a modification of the invention.

In the modification shown in Fig. 2, the crystal 1 has one electrode grounded, and the inductance 4 in the quarter wave network (which is otherwise as in Fig. 1) is in the ungrounded lead from the crystal, the negative resistance tube being inductively coupled to the said inductance. This coupling is effected by means of a coil 24, one end of which is connected to the grounded side of the crystal 1 and the earthed end of a resistance 25 in the cathode leg of the negative resistance tube (which in this case is shown as a triode 7'), while the other end of coil 24 is connected through a capacity 26 and a resistance 27 in series, in the order stated, to the grid 20' of the triode. The junction point of the capacity 26 and the resistance 27 is connected through a further resistance 28 to a variable tap 19' on a potentiometer resistance 18' shunted across the high tension source. The said source is connected at HT+ and HT− between the anode 12' and earth, and a bypass condenser 22 is provided across it. An intermediate tap 29 on the coil 24 is connected through a condenser 30 to the cathode 14' of the tube 7'. If desired the coupling between the coil 24 and the inductance 4 in the quarter wave network may be variable. With this arrangement, the negative resistance applied across the inductance in the quarter wave network may be adjusted by adjusting the potentiometer tap 19', and this adjustment is varied as already described.

The invention is not limited to the use of the particular negative resistance circuits above described although these circuits are preferred by reason of their simplicity and ease of control.

What is claimed is:

1. In combination, an oscillator, a piezoelectric crystal coupled thereto as a frequency controlling element, an impedance inverting network in the coupling between said crystal and said oscillator, said network introducing undesired loss in said coupling, and separate means for producing negative resistance and for applying said negative resistance to said network so as to substantially counterbalance said loss.

2. The combination defined in claim 1, wherein the negative resistance is produced by an electron discharge tube circuit and wherein the negative resistance is applied to the network by connecting such tube in parallel with the loss-introducing component of the network.

3. In combination, an oscillator, a piezoelectric crystal and an impedance inverting network coupled thereto as a frequency controlling element, said network introducing undesired loss in the oscillator, and separate means for reducing said loss comprising an electron discharge device connected in shunt with said network.

4. The combination defined in claim 3, wherein the network is a quarter-wave network.

5. In combination, an oscillator, a piezoelectric crystal and an impedance inverting network coupled thereto as a frequency controlling element, said network introducing undesired loss in the oscillator, and separate means for reducing said loss comprising an electron discharge device having an anode, a control grid, a screen grid and a cathode, a source of high voltage connected between said anode and cathode, a resistor connected across said source, a connection from said control grid to a point on said resistor, a connection from said screen grid through a condenser to one side of said network, and a connection from said cathode to the other side of said network.

6. The combination defined in claim 5, wherein the discharge device also has a suppressor grid and wherein such suppressor grid is connected through a separate condenser to said one side of said network.

WILFRID SINDEN MORTLEY.

REFERENCES CITED

The following references are of record in the file of this patent:

UNITED STATES PATENTS

| Number | Name | Date |
|---|---|---|
| 2,029,488 | Koch | Feb. 4, 1936 |
| 2,043,242 | Gebhard | June 9, 1936 |
| 2,092,147 | Barton | Sept. 7, 1937 |
| 2,175,174 | Bessemer | Oct. 10, 1939 |
| 2,442,770 | Kenyon | June 8, 1948 |
| 2,454,933 | Luck | Nov. 30, 1948 |

FOREIGN PATENTS

| Number | Country | Date |
|---|---|---|
| 622,140 | Great Britain | Apr. 27, 1949 |